United States Patent Office 3,353,968
Patented Nov. 21, 1967

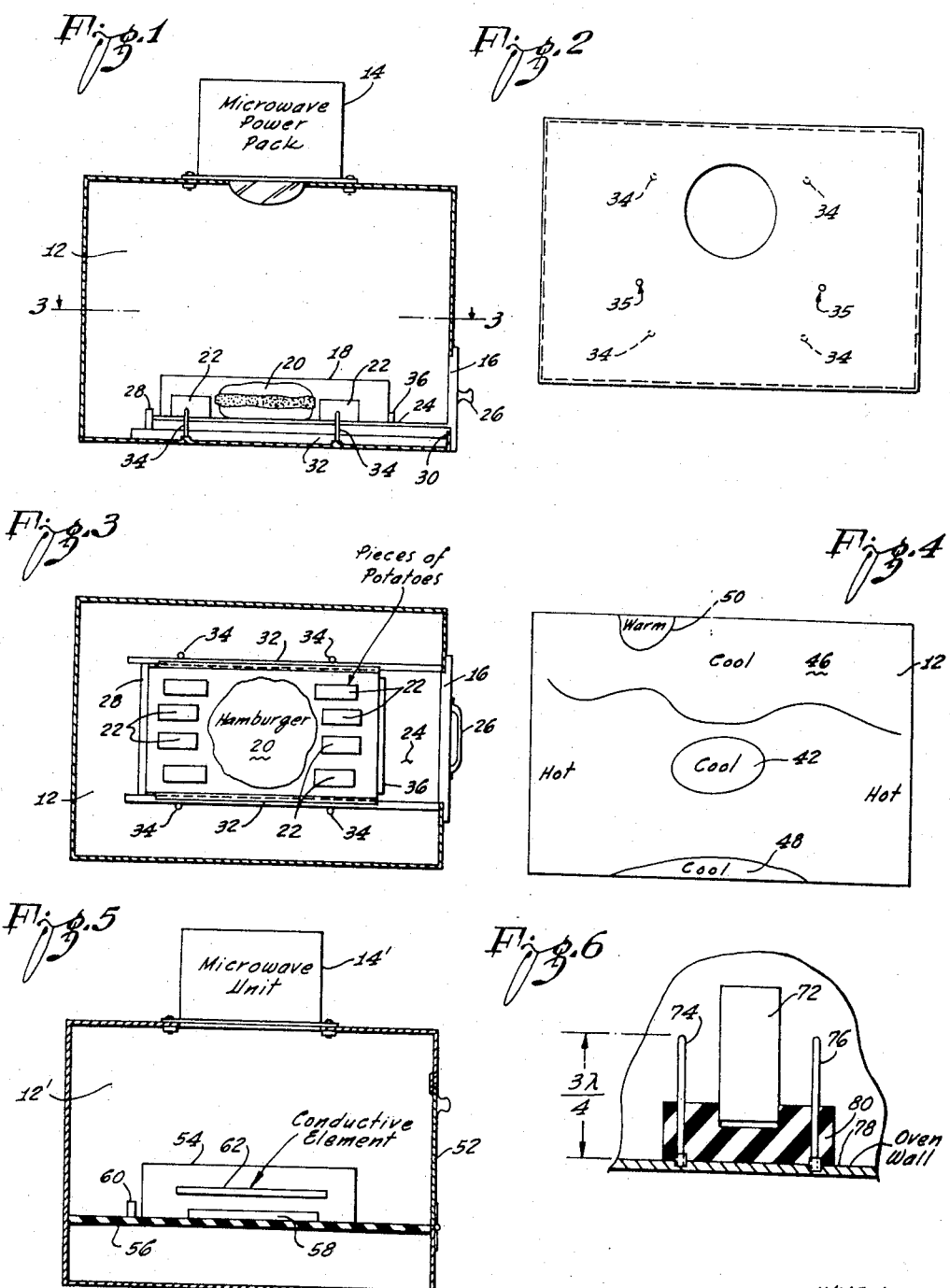

3,353,968
FOOD PACKAGE FOR USE IN MICROWAVE HEATING APPARATUS
Edward Z. Krajewski, Minneapolis, Minn., assignor to Litton Precision Products, Inc., San Carlos, Calif., a corporation of Delaware
Original application Feb. 1, 1963, Ser. No. 255,639, now Patent No. 3,271,552, dated Sept. 6, 1966. Divided and this application May 16, 1966, Ser. No. 550,478
5 Claims. (Cl. 99—192)

ABSTRACT OF THE DISCLOSURE

In order to enhance the heating of frozen food within modern electronic ovens the food is packaged in a dielectric wrapper which allows microwave energy to penetrate therethrough to heat the food. At least two elongated strips of conductive material are selectively located on the dielectric wrapper and influence the distribution of the microwave field within the oven so as to concentrate more of the microwave field at particular locations within the frozen food package. This allows some portions of the frozen food which require more energy to receive more heating energy so that it may be heated in the same period of time as another portion of the frozen food that does not require as much heating energy.

---

This is a division of application Ser. No. 255,639, filed Feb. 1, 1963 and now U.S. Patent 3,271,552. This invention relates to microwave cooking apparatus and more particularly to a food package for use in microwave heating apparatus for concentrating microwave energy at desired points within the package.

It is well known that microwave energy will cook food. One authorized microwave frequency which is widely used for cooking is 2,450 megacycles per second. The microwave power source is characteristically a magnetron, and a conductively bounded resonant chamber serves as the oven. Food to be cooked is normally mounted in any desired point within the oven as long as it is not mounted directly against the conductive walls. In order to obtain a relatively uniform heating throughout the oven, some arrangement is usually provided for varying the modes of energization of the oven. Such devices may take the form of a fan rotating in front of the microwave feed to the oven, and such devices are known as "mode mixers."

While the microwave ovens as described above are eminently suitable for general purpose high frequency cooking, they are not entirely satisfactory for the cooking of special prepackaged foods. Thus, for example, the mode mixing structures desirable for the uniform distribution of heat in an oven are unnecessarily expensive and elaborate for many microwave heating applications. In addition, the uniform heating conditions in such a microwave oven are not suitable for the simultaneous cooking of different types of foods which are frequently included in a single prepackaged food container.

Accordingly, one object of the present invention is to simplify microwave cooking apparatus for prepackaged food.

Another object of the present invention is to accommodate, in a single microwave cooking apparatus, food of different microwave cooking properties.

In the case of standardized prepackaged food for use with a coin-operated dispensing apparatus, for example, it would be desirable to avoid the use of a mode mixer and to concentrate the energy at the proper points in the food package. As a preliminary step in this direction, the microwave field strength or heating effect of the microwave energy within an oven may be plotted and the food may be located at suitable points within the oven. In the case of different types of food which are to be heated simultaneously within the same oven, the microwave energy absorption properties of the food must also be taken into consideration. Thus, when a hamburger and small potato pieces are to be cooked simultaneously, the microwave properties of the hamburger are such that it absorbs considerably more energy than the potato strips. Microwave energy absorption is significantly greater in food masses, such as the hamburger, which are large with respect to a half wave length than in food masses, such as the potato strips, which are small with respect to a half wave length. The hamburger may, therefore, be placed in the oven at relatively low field strength points and is still heated more rapidly than the potato strips which are placed at high field strength points.

In order to heat food items, such as the potato strips, to a greater degree, it is desirable to concentrate the microwave energy to an even greater extent than is possible through the use of the natural distribution of microwaves in a conductive oven cavity. In order to accomplish this concentration, in accordance with the invention, supplemental radiating elements, in the nature of small parasitic antennas, are employed. These elements may be one-fourth wave length long and be secured to selected locations on the food package. Other locations and lengths for the conductive elements may be employed; in each case the food to which concentrated microwave energy is to be applied, should be located between the high voltage points on the supplemental parasitic antenna elements.

It is noted, in passing, that the results which have been achieved were quite surprising to several persons skilled in the microwave cooking art. Thus, according to conventional theory, the electromagnetic mode pattern in a high-Q cavity, such as is presented by the bare conductively bounded oven, should not be significantly affected by the presence of reradiating conductive elements. However, perhaps due to the reduction in Q, or criticality of resonance, by the food in the oven, concentration and redistribution of microwave energy has been achieved.

The novel features which are believed to be characteristic of the invention both as to its organization and method of operation, together with further objects and advantages thereof, will be better understood from the following description considered in connection with the accompanying drawings in which illustrative embodiments of the invention are disclosed, by way of example. It is to be expressly understood that the drawings are for the purposes of illustration and description only and do not constitute a limitation of the invention.

In the drawings:

FIGURE 1 is a cross-sectional view of a microwave oven illustrating the principles of the present invention;

FIGURE 2 indicates the nature of the feed of the microwave energy to the oven of FIGURE 1;

FIGURE 3 is a view taken along lines 3—3 of FIGURE 1 and shows the position of the parasitic antennas with respect to the food tray;

FIGURE 4 is a diagram indicating the heat distribution in the oven structure of FIGURE 1 without the supplemental dipole radiating elements;

FIGURE 5 is an illustrative view of an alternative embodiment of the invention; and FIGURE 6 shows another embodiment of the invention.

With reference to the drawings, FIGURE 1 shows a typical small size microwave oven 12 which is provided with a power pack 14 for supplying microwave energy. The power pack 14 may be of any well known design, such as, for example, that shown in U.S. patent application Ser. No. 806,621 entitled, "Microwave Frequency Heating Apparatus," filed Apr. 15, 1959, now Patent No.

3,104,303. The oven 12 is also provided with a removable closure 16 for inserting and removing food packages, such as package 18. The particular package 18 is made of insulating material and encloses a hamburger 20 and potato strips 22. In the embodiment of FIGURE 1, the oven closure 16 is made of conductive material and is secured to a drawer-type rack 24 of insulating material upon which the food package 18 may be placed. The handle 26 is employed to open the closure 16 and selectively move the rack 18 between its inner position and the outer "load" position where it is outside the oven structure. The rack 24 is provided with an inner end support 28 which also abuts the lip 30 below the closure 16 to prevent complete withdrawal of rack 24 from the oven assembly, in normal usage. Insulating guide members 32 are also provided to guide the rack 24 properly within the oven when the closure 26 is put back to its "cooking" position shown in FIGURE 1.

The radiating elements 34 are provided within the oven structure to concentrate microwave energy at desired areas. As indicated generally in FIGURE 2, the power pack 14 has its radiating window 15 located slightly to the rear of the center of the microwave oven 12. More specifically, the radiating window is located centrally with respect to the longer dimension of the microwave oven and its front edge is approximately on the centerline of the smaller dimension of the oven. The diagram of FIGURE 2 also indicates the location of the radiating elements 34 in the absence of the rack structure for inserting and removing food to be processed. The mounting studs 35 for the heating unit 14 are also shown in FIGURE 2, as they affect the energy distribution within the cavity to a minor degree. For completeness, it is also noted that the microwave cavity is relatively small, having horizontal dimensions of eight and one-half inches by twelve and one-fourth inches.

FIGURE 3 is a view taken along lines 3—3 of FIGURE 1. It shows to advantage the insulating rack 24, the support element 28 and the side guides 32. In addition, the radiating elements 34 are accurately shown with regard to the position of the potato strips 22. The locating member 36 at the other end of the food package 18 from the member 28 is also clearly shown in FIGURE 3.

With regard to the nature of the conductive stubs 34, they are preferably secured in conductive engagement with the side walls of the oven 12, which are also of conductive material. With regard to the food package 18, the meat of the hamburger 20 tends to absorb heat much more readily than the potato strips 22. Initial heat distribution tests of the oven 18, at a height between one-half inch and one inch from the oven floor, are shown in FIGURE 4. Thus, in the absence of the radiating elements 34, the oven 12 had a central cool zone 42, an adjacent hot area 44, additional cool zones 46 and 48, and a small warm zone in region 50.

Because of the high heat absorption characteristics of the hamburger meat, it may be placed in a relatively cool zone, such as area 42 of the oven, and it will still absorb a much greater amount of the available heat than the potato strips 22. In order to increase the intensity of microwave energy in the vicinity of the potato strips, the additional radiating elements 34 are provided as indicated in FIGURES 1 and 3 of the drawings. These radiating stubs 34 are preferably one-fourth wave length long and therefore have high voltage maxima at their ends which are remote from the side wall of the oven. Accordingly, they direct high intensity microwave energy through the strips of potato, which are located on both sides of the hamburger as best shown in FIGURE 3.

It is noted in passing that alternative arrangements may be used in the present apparatus. Thus, instead of using one-fourth wave length stubs 34, antenna elements which are an odd multiple of one-fourth wave length may be employed. Similarly, other conductive structures having voltage distribution characteristics may be employed within the cavity in such a manner that the food is mounted between high voltage points (at the ends of the elements or elsewhere) to concentrate energy in the food. In addition, the oven closure member 16 may be provided with metal springs or other suitable latching arrangements to insure good conductive engagement with the edges of the microwave oven around the opening. These last-mentioned arrangements are well known in the art and will not be discussed in detail in the present specification. In addition, a suitable cycling switch may be mechanically coupled to the closure member 16 so as to start a brief cycle of operation of the microwave power pack 14 upon closing of the member 16.

An embodiment of the present invention is disclosed in FIGURE 5. In this embodiment the microwave oven 12′ is again provided with a microwave source 14′, and a door 52 may be employed to permit the insertion of packages 54 of a frozen or refrigerated food into the oven. A suitable insulating rack 56 and associated guide elements 58 and 60 may be employed to mount the food package 54 at a suitable central location within the oven 12′. Instead of the one-fourth wave length stubs 34, as shown in FIGURE 1, conductive elements 62 may be provided on either side of the food package 54. The conductive strips 62 are secured to and form part of the food package 54. By way of example, the package may be provided with aluminum strips on either side; alternatively, pointed aluminum rods may be pinned or otherwise inserted into the side of the wrapper of the food package 54 so that they are electrically located as indicated in FIGURE 5. These strips are clearly non-contacting or discrete, as variously termed. For the food package including a central hamburger and potato strips at each end, two conductive elements may be employed, one on each of the two long, narrow sides of the food package. For other food packages, other geometries may be preferred. When half wave length elements are employed, the voltage maxima appear at the ends of the elements and therefore concentrate the energy in the desired heating zone, through the potato strips. Other geometries may be used to concentrate energy at points intermediate the ends of the conductive elements, when such a form of heat distribution is considered desirable.

FIGURE 6 illustrates an arrangement in which a frozen food package 72 is defrosted through the use of two conductive elements 74 and 76 which are secured in a wall 78 of microwave oven, suitably by screwing them into threaded holes. The insulating block 80 may be provided with two holes so that it may be mounted over the conductive studs 74 and 76. The insulating block 80 therefore locates the frozen food package 72 with its center substantially between the ends of radiating elements 74 and 76. One of the problems which is presented in the defrosting of frozen food packages involves the peripheral defrosting and overheating, while the center of the package is still frozen.

In accordance with the arrangement of FIGURE 6, this problem is avoided by concentrating microwave energy near the center of the frozen food package. The insulating block 80 should preferably be of low dielectric constant material to avoid distortion of the electromagnetic wave pattern produced by the oven and the reradiating elements 74 and 76.

At the frequency of 2,450 megacycles mentioned above, one-quarter wave length is approximately 1.1 inches and one-half wave length is approximately 2.2 inches in free space. When the microwaves travel through or adjacent to material, such as food, having a dielectric constant greater than 1.0 (the dielectric constant of a vacuum), the wave length figures given above increase to some extent. Advantageously, the metal strips are designed with regard to the microwave properties of the particular food package which is to be heated to produce high voltage points through the material where concentrated microwave energy is desired.

As mentioned above, an empty microwave oven is a high-"Q" resonant cavity. The Q of a cavity is proportional to the energy stored in a cavity or other tuned circuit and is inversely proportional to the losses of the circuit. According to microwave theory, in the case of a high-Q cavity, it would not be anticipated that the presence of conductive elements would affect the field distribution significantly. Surprisingly, however, a substantial effect has indeed been observed and the redistribution of microwave energy is exceedingly useful in cooking food where the microwave energy must be concentrated in particular heating zones. It is believed that this may be caused by the reduction in Q of the cavity caused by the presence of the food.

It is to be understood that the above-described arrangements are illustrative of the application of the principles of the invention. Numerous other arrangements may be devised by those skilled in the art without departing from the spirit and scope of the invention. Thus, by way of example and not of limitation, other arrangements of reradiating elements and heating cavity configurations, as well as other arrangements for accurately positioning prepackaged food in the cavity, may be employed. In another patent application, Ser. No. 255,640, filed Feb. 1, 1963, now U.S. Patent 3,271,169 of Berkley J. Baker and Edward Z. Krajewski, entitled "Microwave Cooking Technique," filed concurrently with the above-mentioned application Serial No. 255,639, an arrangement is shown wherein the radiating elements are associated with an oven cavity which is closed by the conductive portions of a food package. Accordingly, from the foregoing remarks, it is understood that the present invention is to be limited only by the spirit and scope of the appended claims.

What is claimed is:
1. A frozen food package adaptable for reheating in a microwave oven comprising centrally located frozen food, a dielectric wrapper, and means for concentrating microwave energy in selected portions of said frozen food, said means comprising at least two non-contacting spaced thin elongated strips of conductive material attached to said wrapper.
2. The frozen food package of claim 1 in which said strips are an integral number of quarter wave lengths long.
3. The food package of claim 2 in which said strips are an odd number of quarter wave lengths long.
4. The food package of claim 2 in which said strips are an even number of quarter wave lengths long.
5. The food package of claim 1 wherein said strips are attached to the outer surface of said wrapper.

References Cited
UNITED STATES PATENTS

| 2,714,070 | 7/1955 | Welch | 99—221 |
| 3,219,460 | 11/1965 | Brown. | |

LIONEL M. SHAPIRO, *Primary Examiner.*

A. LOUIS MONACELL, *Examiner.*